(12) United States Patent
Boyce et al.

(10) Patent No.: US 6,306,197 B1
(45) Date of Patent: Oct. 23, 2001

(54) ISOPROPYL ALCOHOL SCRUBBING SYSTEM

(75) Inventors: Allen R. Boyce; Michael Ferrigno, both of Portland, OR (US); Debasish Mukhopadhyay, Palo Alto, CA (US)

(73) Assignee: SEH America, Inc., Vancouver, WA (US)

(*) Notice: Subject to any disclaimer, the term of this patent is extended or adjusted under 35 U.S.C. 154(b) by 0 days.

(21) Appl. No.: 09/556,118

(22) Filed: Apr. 19, 2000

(51) Int. Cl.$^7$ .................................................. B01D 53/14
(52) U.S. Cl. ....................... 95/9; 95/188; 95/206; 95/237; 96/240; 96/417
(58) Field of Search ................ 96/237, 240, FOR 118, 96/417; 95/211, 237, 156, 188, 196, 205, 206, 9

(56) References Cited

U.S. PATENT DOCUMENTS

| | | |
|---|---|---|
| 3,651,617 * | 3/1972 | Hodgson . |
| 3,721,621 | 3/1973 | Hough . |
| 3,733,788 * | 5/1973 | Crowley . |
| 3,870,033 | 3/1975 | Faylor et al. . |
| 3,953,580 | 4/1976 | Allen et al. . |
| 3,964,999 | 6/1976 | Chisdes . |
| 3,985,648 | 10/1976 | Casolo . |
| 4,182,676 | 1/1980 | Casolo . |
| 4,235,715 | 11/1980 | Wiegert . |
| 4,235,845 | 11/1980 | Bose . |
| 4,321,145 | 3/1982 | Carlson . |
| 4,399,107 | 8/1983 | Bose . |
| 4,425,313 | 1/1984 | Cooper . |
| 4,430,226 | 2/1984 | Hegde et al. . |
| 4,532,045 | 7/1985 | Littmann . |
| 4,532,047 | 7/1985 | Dubin . |
| 4,548,716 | 10/1985 | Boeve . |
| 4,574,049 | 3/1986 | Pittner . |
| 4,698,153 | 10/1987 | Matsuzaki et al. . |
| 4,732,609 | 3/1988 | Frey et al. . |
| 4,755,298 | 7/1988 | Grinstead . |

(List continued on next page.)

FOREIGN PATENT DOCUMENTS

| | | | |
|---|---|---|---|
| 17 92 304 | 8/1975 | (DE) . | |
| 26 07 737 | 9/1976 | (DE) . | |
| 196 03 494 | 8/1997 | (DE) . | |
| 553684 * | 8/1993 | (EP) | ............................ 96/FOR 118 |
| 50-75987 | 6/1975 | (JP) . | |
| 50-88017 | 7/1975 | (JP) . | |
| 53-4777 | 1/1978 | (JP) . | |
| 54-69579 A | 4/1979 | (JP) . | |
| 54-83688 | 7/1979 | (JP) . | |
| 56-139106 | 10/1981 | (JP) . | |
| 52-122084 | 7/1983 | (JP) . | |
| 58-118538 | 7/1983 | (JP) . | |
| 59-112980 | 6/1984 | (JP) . | |
| 62-204892 | 9/1987 | (JP) . | |
| 2-207888 | 8/1990 | (JP) . | |
| 2-227185 | 9/1990 | (JP) . | |

*Primary Examiner*—Duane S. Smith
(74) *Attorney, Agent, or Firm*—Alston & Bird LLP

(57) ABSTRACT

A system and method for treating process gas streams containing isopropyl alcohol (IPA) to reduce the concentration of IPA therein. The invented system includes a scrubber unit that receives a process stream containing a concentration of IPA and reduces the concentration of IPA therein to below a determined threshold. The scrubber includes a reverse osmosis assembly that significantly reduces water consumption for the scrubbing process as compared to conventional once-through systems. The system may be operated at an elevated pH to prevent biofouling from inhibiting the operation of the reverse osmosis assembly. The system may contain a softening step on the make up water system to prevent scaling in the reverse osmosis system and a softening step on a sidestream of the scrubber water recirculation loop to reduce scrubber tower salting/scaling and to control the pH of the scrubbing liquid.

33 Claims, 4 Drawing Sheets

U.S. PATENT DOCUMENTS

| | | |
|---|---|---|
| 4,820,421 | 4/1989 | Auerswald . |
| 4,824,574 | 4/1989 | Cadotte et al. . |
| 4,900,450 | 2/1990 | Schmidt . |
| 4,917,806 | 4/1990 | Matsunaga et al. . |
| 4,969,520 | 11/1990 | Jan et al. . |
| 4,976,864 | 12/1990 | Baradel et al. . |
| 4,995,983 | 2/1991 | Eadie et al. . |
| 5,028,336 | 7/1991 | Bartels et al. . |
| 5,061,374 | 10/1991 | Lewis . |
| 5,064,625 | 11/1991 | Curtius . |
| 5,073,268 | 12/1991 | Saito et al. . |
| 5,082,483 | 1/1992 | Spencer et al. . |
| 5,112,587 | 5/1992 | von Wedel et al. . |
| 5,131,928 * | 7/1992 | Blachman et al. . |
| 5,174,901 | 12/1992 | Smith . |
| 5,236,722 | 8/1993 | Schroeder . |
| 5,246,586 | 9/1993 | Ban et al. . |
| 5,250,185 | 10/1993 | Tao et al. . |
| 5,266,203 | 11/1993 | Mukhopadhyay et al. . |
| 5,292,439 | 3/1994 | Morita et al. . |
| 5,338,456 | 8/1994 | Stivers . |
| 5,358,640 | 10/1994 | Zeiher et al. . |
| 5,385,664 | 1/1995 | Oinuma et al. . |
| 5,397,549 | 3/1995 | Newman . |
| 5,414,100 | 5/1995 | Ayorinde et al. . |
| 5,476,591 | 12/1995 | Green . |
| 5,529,689 | 6/1996 | Korin . |
| 5,571,419 | 11/1996 | Obata et al. . |
| 5,573,666 | 11/1996 | Korin . |
| 5,637,282 | 6/1997 | Osborne et al. . |
| 5,670,053 | 9/1997 | Collentro et al. . |
| 5,695,643 | 12/1997 | Brandt et al. . |
| 5,714,055 | 2/1998 | Lewis et al. . |
| 5,766,479 | 6/1998 | Collentro et al. . |
| 5,770,041 | 6/1998 | Lewis et al. . |
| 5,785,859 * | 7/1998 | Raehse et al. .......................... 95/188 |
| 5,830,260 * | 11/1998 | Yueksel et al. .......................... 95/188 |
| 5,895,772 | 4/1999 | Grigorova et al. . |
| 5,925,255 | 7/1999 | Mukhopadhyay . |

* cited by examiner

ISOPROPYL ALCOHOL SCRUBBING SYSTEM

TECHNICAL FIELD

The invention relates generally to treatment systems for process exhaust streams containing isopropyl alcohol, and more particularly to a gas scrubbing system and method for removing isopropyl alcohol from a process stream.

BACKGROUND OF THE INVENTION

Isopropyl alcohol (IPA), or 2-propanol, is commonly used as a solvent and/or drying agent in many industrial applications. For example, IPA is used in deionized water in many semiconductor processing facilities to reduce surface tension in a finishing rinse to clean silicon wafers. Both liquid and gas-phase IPA-laden waste streams are often generated. Limitations are placed upon the amount of liquid IPA that may be introduced into the publicly owned treatment works (sewer), often in conjunction with the requirement to pay fees proportional to the amount of organic carbon associated with the IPA being released. In addition, the resultant IPA-laden gas stream must be treated before being discharged into the environment.

A variety of treatment mechanisms have been used to treat IPA-containing gas streams. However, none have provided a cost- and materials-effective solution. Known procedures typically have high consumption rates of water and other materials, require frequent maintenance and cleaning, or require expensive equipment and/or materials.

SUMMARY OF THE INVENTION

The present invention provides a system and method for cost-effective removal of IPA from a gas stream. The invented system includes a gas scrubber unit that receives a process gas stream containing a concentration of IPA in the gas stream and reduces the concentration of IPA therein to below a determined threshold for discharge into the atmosphere. The scrubber includes a reverse osmosis (RO) assembly that significantly reduces water consumption for the gas scrubbing process as compared to conventional once-through systems. The system may be operated at an elevated pH to prevent biofouling from inhibiting the cost-effective operation of the reverse osmosis assembly. The system may also be adapted to soften the water streams used in the system, such as to remove polyvalent cations that may cause scaling of the RO membranes, and to remove and sodium ions, which may cause salting/scaling of the pacing using in the scrubber tower.

DETAILED DESCRIPTION AND BEST MODE OF THE INVENTION

Figure 1:
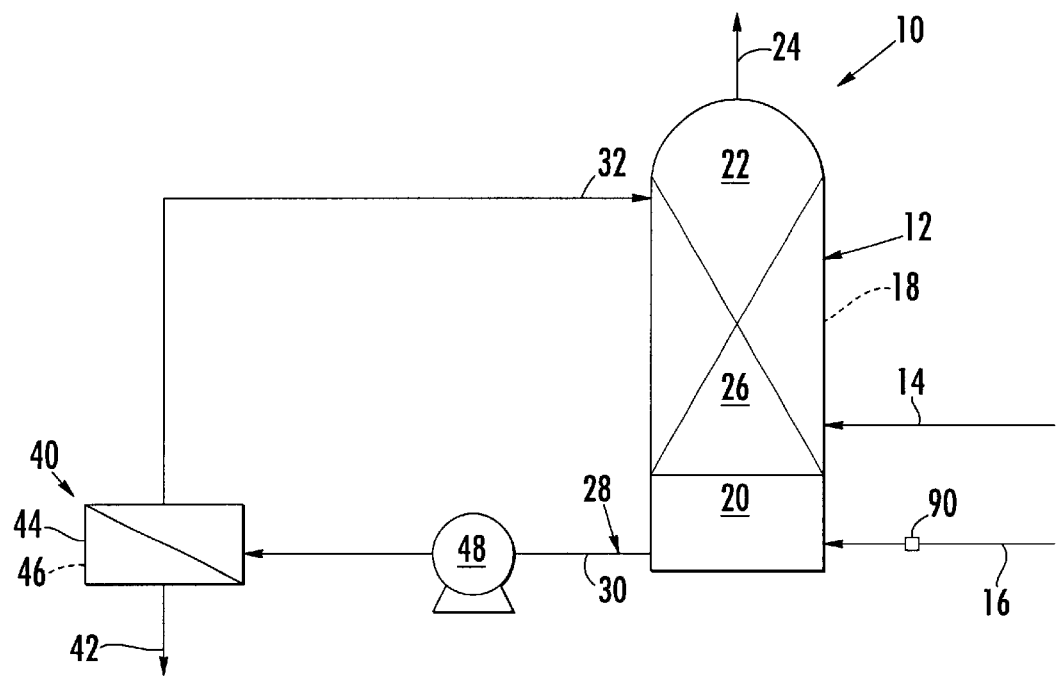
FIG. 1 is a schematic view of an isopropyl alcohol scrubbing system according to the present invention.

An isopropyl alcohol (IPA) scrubbing system according to the present invention is shown in FIG. 1 and generally indicated at 10. System 10 includes at least one scrubber 12, which receives a gas feed stream 14 containing a concentration of IPA and a makeup water stream 16. An example of a common feed stream is a gas phase effluent or exhaust stream from a facility in which IPA is used. An example of such a facility is a semiconductor processing facility, such as a semiconductor manufacturing facility, FAB and the like. The FAB may contain one or many processes steps utilizing manufacturing equipment, termed tools by the industry, which use IPA as part of the process chemistry. The process at the tool utilizing IPA often will be at, or slightly above, room temperature. Makeup water stream 16 may come from any suitable source, including a deionized water source, a reclaim water source from a processing facility, an external (municipal or other) water supply, etc. Prior to delivery to scrubber 12, stream 16 may be filtered, softened to remove calcium and various polyvalent cations, and exposed to UV light or chlorine added to eliminate potentially destructive biological agents that may affect the operation of the system.

Scrubber 12 utilizes any suitable form of packing or tray design 18, as will be selected depending upon such factors as the composition and phase of feed stream 14, the diameter of scrubber 12 and the expected flowrate through scrubber 12. For the flowrates and operating conditions discussed herein, a packed vertical tower has proven effective. As shown, scrubber 12 includes a sump, or basin, portion 20 in which liquid accumulates, a return portion 22 through which an exhaust stream 24 is exhausted, and a central scrubbing region 26 through which the water and feed streams interact. In some scrubber configurations within the scope of the present invention, return portion 22 is a top portion and exhaust stream 24 is a gas stream. However, other configurations and makeups are possible, for example, depending upon the scrubber configuration and the composition of feed and exhaust streams 14 and 24.

Scrubber 12 further includes a water recirculation loop 28 through which accumulated liquid is drawn from sump portion 20 and delivered to top portion 22. As shown, recirculation loop 28 includes a recirculation feed stream 30 leaving the sump portion, and a recirculation product stream 32 returning to the top portion of the scrubber. The fluid recirculated by recirculation loop 28 passes downward through scrubbing region 26 as the gas feed stream rises through the region. The water and gaseous streams interact as they pass through the tower in this counter-current design, with the goal of reducing the concentration of IPA in the exhaust stream to below a selected threshold, or maximum, level.

Although the configuration of the scrubber illustrated in FIG. 1 shows a countercurrent flow between the recycled water stream and the IPA-containing gas phase effluent stream, it should be understood that any suitable flow pattern may be used, including crosscurrent, cocurrent and misting. It should be understood that the gas and gas-phase streams referred to herein may contain one or more non-gas components, but will be at least substantially comprised of gaseous component(s). Similarly, the liquid and liquid-phase streams referred to herein may contain one or more non-liquid components, but will be at least substantially comprised of liquid component(s).

Unlike known IPA scrubbers, system 10 further includes a reverse osmosis (RO) assembly 40 adapted to reduce the concentration of IPA in the recirculation liquid stream to below a determined threshold value. For example, the threshold value may correspond to a maximum amount of IPA in the scrubber liquid phase selected or required IPA gas emission limits. Typically, the value will be sufficiently less than a known operating limit in the liquid phase to provide a selected margin for variance in the exhaust gas phase without exceeding the regulated environmental limit. RO assembly 40 receives the recirculation feed stream and removes IPA therefrom to produce a concentrated RO waste stream 42 and recycle product stream 32. Reverse osmosis assembly 40 includes at least one reverse osmosis unit 44, each of which houses a membrane 46 selected to reject IPA and thereby reduce the concentration of IPA in the product, or permeate, stream from the RO unit. The recovery rate of the RO units may vary, depending upon desired performance and operating conditions, with recovery rates in the range of approximately 50% to approximately 95% being common. As an illustrative example, the RO units may be operated at a 75% single-pass recovery rate, meaning that 75% of the flow will pass through the membrane to form a permeate stream with less than a determined concentration of IPA, with the remaining 25% forming a waste stream containing at least a significant portion of the IPA. Experiments have shown that at least 80–95% of the IPA in the recycle stream may be removed with a loss of only approximately 5–10% of the overall flowrate.

Thin film composite (TFC) membranes of polyamide material have proven effective for this application. Suitable TFC membranes are available from Hydranautics, Inc. of Oceanside, Calif. and typically take the form of elongate tubes. From RO assembly 40, the permeate stream, which preferably has a concentration of IPA that is below a selected threshold concentration, forms recirculation product stream 32, with the bulk of the IPA being contained in concentrated waste stream 42.

Figure 2:
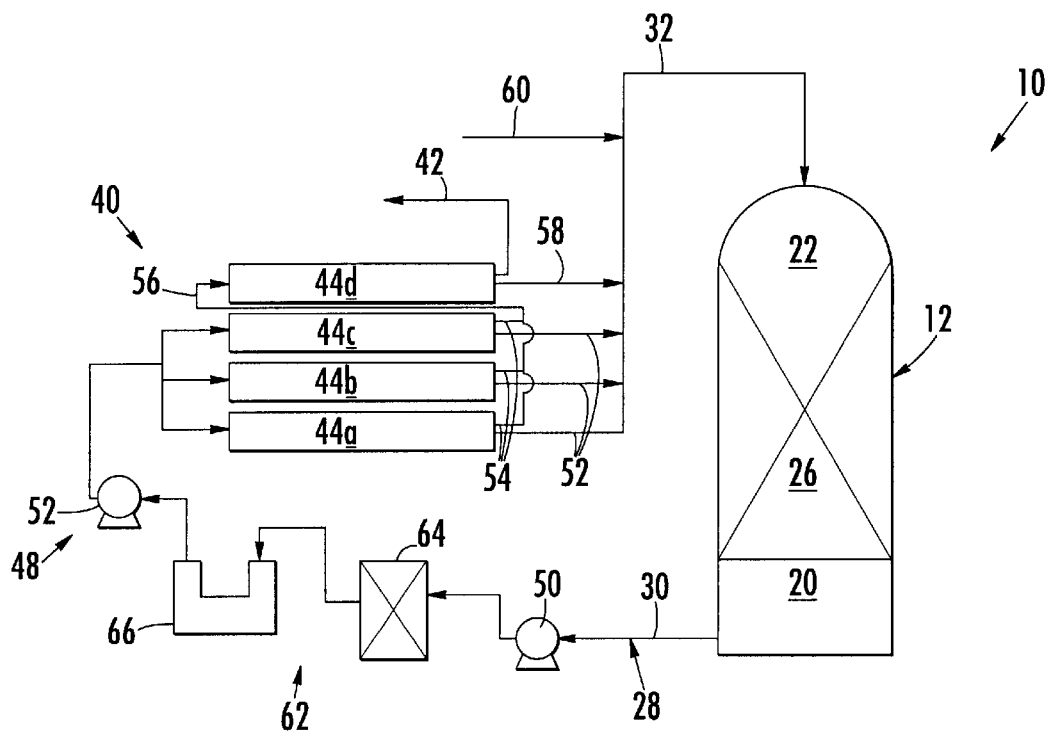
FIG. 2 is an enlarged detail showing an illustrative embodiment of the reverse osmosis assembly of the system of FIG. 1.

RO assembly 40 will typically include a pump assembly 48 containing one or more pumps adapted to transport the recirculation stream to the RO units and to ensure that there is sufficient downstream pressure at the output of the RO assembly. In FIG. 2, pump assembly 48 is shown including a transfer pump 50 that draws the recycle feed stream from sump portion 20 of the scrubber and transports the stream toward RO assembly 40. Also shown is one or more high-pressure, or booster, pumps 52 that ensure that the recycle feed stream is at a sufficient upstream pressure before entering the RO assembly to account for the pressure drop as the stream passes through one or more RO units. It should be understood that the pressure required may vary depending upon such factors as the flowrate of fluid in the recycle stream, the pressure drop within the individual RO units, the number of RO units connected in series, the efficiency of the RO units, any contamination, damage or other fouling of the RO membranes, etc. For the purpose of illustration, a 5 horsepower transfer pump has proven effective for recycle feed streams with a flowrate of approximately 80 gpm. For this flowrate and the subsequently described 3×1 RO membrane assembly configuration, a pressure of 250 psi has been a suitable upstream pressure achieved by booster pump(s) 52.

In FIG. 1, RO assembly 40 is schematically illustrated with a single RO unit 44; however, the number of RO units 44 in a particular system may vary. In FIG. 2, an illustrative example of an RO assembly with more than one RO unit 44 is shown. Specifically, the recycle product stream is delivered by pump assembly 48 to three RO units 44a, 44b and 44c connected in parallel. From each RO unit 44a–c, a permeate stream 52 and a waste stream 54 are produced. The concentration of IPA in the permeate stream 52 is substantially reduced from that of recycle feed stream 30, with waste stream 54 containing the removed IPA. As shown, the waste streams 54 from each of the RO units connected in parallel are united to form a feed stream 56 for a fourth RO unit 44d, which in turn produces another permeate stream 58 and concentrated waste stream 42. The permeate streams from all of the RO units collectively form recycle product stream 32 to the top portion of the scrubber, with the collective waste streams forming RO concentrated waste stream 42.

The RO assembly shown in FIG. 2 may be referred to as a 3×1 assembly in that three RO units remove IPA from the recycle feed stream and a fourth RO unit her concentrates the waste stream and thereby reduces the overall makeup water demand of system 10 by extracting additional water from the combined waste streams from the initial three RO units. Other combinations of individual RO units in parallel and/or series may be used to provide the selected amount of IPA removal and will tend to vary from IPA system to IPA system, depending for example upon such factors as the gas flowrate through the system, the concentration of IPA in feed gas stream 14 and recirculation liquid stream 30, the desired overall removal of IPA, etc.

For example, in a 20,000 to 40,000 CFM (cubic feet per minute) IPA scrubber with the RO units in a 3×1 configuration, such as discussed above, the removal is approximately 80% of the IPA in the feed stream and approximately a 90% fluid recovery rate. An 80 gpm flowrate to the RO assembly containing an IPA concentration of 700 ppm would produce a product stream with a flowrate of 72 gpm and an IPA concentration of approximately 140 ppm, and a concentrated waste stream with a flowrate of 8 gpm as indicated by test results in Table 1 and Table 2, shown below.

TABLE 1

SAMPLE RESULTS FOR IPA REMOVAL

| Sample No. | Location | IPA Addition (wt %) | NaOH Addition (wt %) | pH | Sample Results (ppm) | IPA Rejection (%) |
|---|---|---|---|---|---|---|
| 1 | Feed | 100/100 | 0 | 7.10 | 690 | n/a |
| 2 | Product | 100/100 | 0 | 7.10 | 12 | 98 |
| 3 | Feed | 0 | 0 | 6.90 | 0 | n/a |
| 4 | Product | 0 | 0 | 6.90 | 0 | n/a |
| 5 | Feed | 0 | 0 | 6.90 | 0 | n/a |
| 6 | Product | 0 | 0 | 6.90 | 0 | n/a |
| 7 | Feed | 0.014 | 0 | 7.10 | 170 | n/a |
| 8 | Product | 0.014 | 0 | 7.10 | 32 | 81 |
| 9 | Feed | 0.035 | 0 | 7.10 | 280 | n/a |
| 10 | Product | 0.035 | 0 | 7.10 | 52 | 81 |
| 11 | Feed | 0.070 | 0 | 7.10 | 700 | n/a |
| 12 | Product | 0.070 | 0 | 7.10 | 130 | 81 |
| 13 | Feed | 0.070 | 0.014 | 11.05 | 700 | n/a |
| 14 | Product | 0.070 | 0.014 | 11.05 | 160 | 77 |
| 15 | Feed | 0.070 | 0.014 | 11.32 | 690 | n/a |
| 16 | Product | 0.070 | 0.014 | 11.32 | 140 | 80 |
| 17 | Feed | 0.072 | 0.004 | 10.18 | 770 | n/a |
| 18 | Product | 0.072 | 0.004 | 10.18 | 150 | 80 |
| 19 | Feed | 0.036 | 0.004 | 10.14 | 280 | n/a |
| 20 | Product | 0.036 | 0.004 | 10.14 | 56 | 80 |
| 21 | Feed | 0.050 | 0.004 | 10.39 | 380 | n/a |
| 22 | Product | 0.050 | 0.004 | 10.39 | 80 | 79 |

TABLE 2

FLOW RESULTS FOR IPA REMOVAL

| Sample No. | Product Flow (gpm) | Waste Flow (gpm) | Total Flow (gpm) | Flow Recovery (%) |
|---|---|---|---|---|
| 1 | 8.7 | 1 | 9.7 | 90 |
| 2 | 9 | 1.25 | 10.25 | 88 |
| 3 | 13 | 1.2 | 14.2 | 92 |

TABLE 2-continued

FLOW RESULTS FOR IPA REMOVAL

| Sample No. | Product Flow (gpm) | Waste Flow (gpm) | Total Flow (gpm) | Flow Recovery (%) |
|---|---|---|---|---|
| 4  | 13 | 1.2 | 14.2 | 92 |
| 5  | 13 | 1.2 | 14.2 | 92 |
| 6  | 13 | 1.2 | 14.2 | 92 |
| 7  | 13 | 1.2 | 14.2 | 92 |
| 8  | 13 | 1   | 14   | 93 |
| 9  | 13 | 1   | 14   | 93 |
| 10 | 13 | 1   | 14   | 93 |
| 11 | 13 | 1   | 14   | 93 |
| 12 | 13 | 1.2 | 14.2 | 92 |
| 13 | 13 | 1.2 | 14.2 | 92 |
| 14 | 13 | 1.2 | 14.2 | 92 |
| 15 | 13 | 1.2 | 14.2 | 92 |
| 16 | 13 | 1.2 | 14.2 | 92 |
| 17 | 13 | 1.2 | 14.2 | 92 |
| 18 | 13 | 1.2 | 14.2 | 92 |
| 19 | 13 | 0.9 | 13.9 | 94 |
| 20 | 13 | 1.2 | 14.2 | 92 |
| 21 | 13 | 0.9 | 13.9 | 94 |

On the other hand, if three parallel RO units 44 are used in parallel without a fourth downstream, concentrate RO unit to treat the waste streams therefrom, the same feed stream produces a recycle product stream with an IPA concentration of only approximately 90 ppm. However, this configuration of three parallel RO units reduces the recovery rate and increases the flowrate of the waste stream by approximately double to 16 gpm. Therefore, when implementing RO assembly 40 to a particular scrubbing system, there is a trade-off between such factors as total IPA removal, water consumption, and materials and equipment cost. These factors may therefore be varied depending upon the particular constraints or goals of a particular facility. For example, system 10 may be configured selectively to minimize water in waste stream 42, or to minimize IPA in the recirculation stream 32. Depending on available equipment, allocated equipment budget, and environmental regulations, an intermediate configuration will be selected. The removal of IPA to the degree projected is demonstrated by test data presented in Table 1.

As any of the above examples demonstrate, the addition of RO assembly 40 to scrubber 12 results in a substantial reduction in makeup water demand and waste. For example, a scrubbing unit without a RO assembly may use 80 gpm of once through scrubbing water. On the other hand, adding RO assembly 40 to the same scrubber reduces the makeup water consumption by at least 70%, and potentially to between approximately 80–95%, as indicated by the percent (%) recovery for IPA testing in Table 2. This reduction in water demand correlates to a substantial savings in daily operating expense because of decreased makeup water supply and disposal expenses, in addition to the less tangible environmental and water conservation benefits.

Because at least a portion of the recirculation feed stream will form the concentrated RO waste stream, the overall flowrate of the recirculation loop will decrease from when the stream leaves the sump portion to when it returns to top portion 22. To account for this liquid loss a sufficient flowrate in makeup water stream 16 is required. The makeup water stream 16 may continuously or periodically replace the fluid lost in waste stream 42. Alternatively, improved efficiency is gained if the makeup water stream is added to the recirculation stream downstream of the RO units to account for any flowrate lost to waste stream 42. An example of such a makeup water stream is shown in FIG. 2 and generally indicated at 60.

System 10 may include a pretreatment assembly adapted to remove selected components from the streams that may impair the effectiveness or operation of the system. An example of such a pretreatment assembly is shown in FIG. 2 and generally indicated at 62. As shown, assembly 62 is located upstream from RO assembly 40. Assembly 62 includes a filter 64 that removes particles from recirculation feed stream 30 that are larger than a selected size. In experiments, a 20-micron filter has proven effective to remove larger particulate, however filters of other sizes or even no filter may be used. Similarly, a filter assembly including a plurality of filters with the same or differing sizes may be used. Also shown in FIG. 2 is a UV lamp 66 that kills biological components in the stream. Suitable UV lamps are produced by Aquionics, Inc. of Cincinnati, Ohio. It should be understood that system 10 may be implemented without RO pretreatment assembly 62 and that assembly 62 may include any of the components described herein in various quantities alone or in combination with any of the other potential components.

System 10 preferably is operated at a high pH, such as a pH in the range of approximately 8 to approximately 14. An advantage of maintaining the system at an elevated pH is that it at least substantially eliminates biofouling of the RO membranes without requiring the added expense of a scale inhibitor and corresponding storage and delivery systems. A pH of between approximately 9 to approximately 11 has proven effective, and should be understood that the RO membranes and other components of system 10 should be compatible with the selected pH, and vice versa. Biofouling refers to the biological growth, such as bacteria, viruses, spores, and endotoxins that may occur on the RO membranes. This growth occludes or otherwise fouls the membranes and prevents fluid from passing through. Cleaning a fouled RO membrane not only is a cost- and labor-intensive procedure, but also requires the RO membrane system to be removed from service while being cleaned. This is especially significant considering the frequency at which cleaning is required without a suitable mechanism for preventing biofouling. Known methods for controlling biofouling in other applications are not applicable for use in IPA scrubbing system 10 because they are either cost prohibitive, tend to vaporize away in the scrubber, or will damage the polyamide, TFC, membranes used in the RO units. Also, many of the known procedures for removing biofouling from polyamide, TFC, membranes produce waste streams that also must be treated before disposal.

Figure 3:
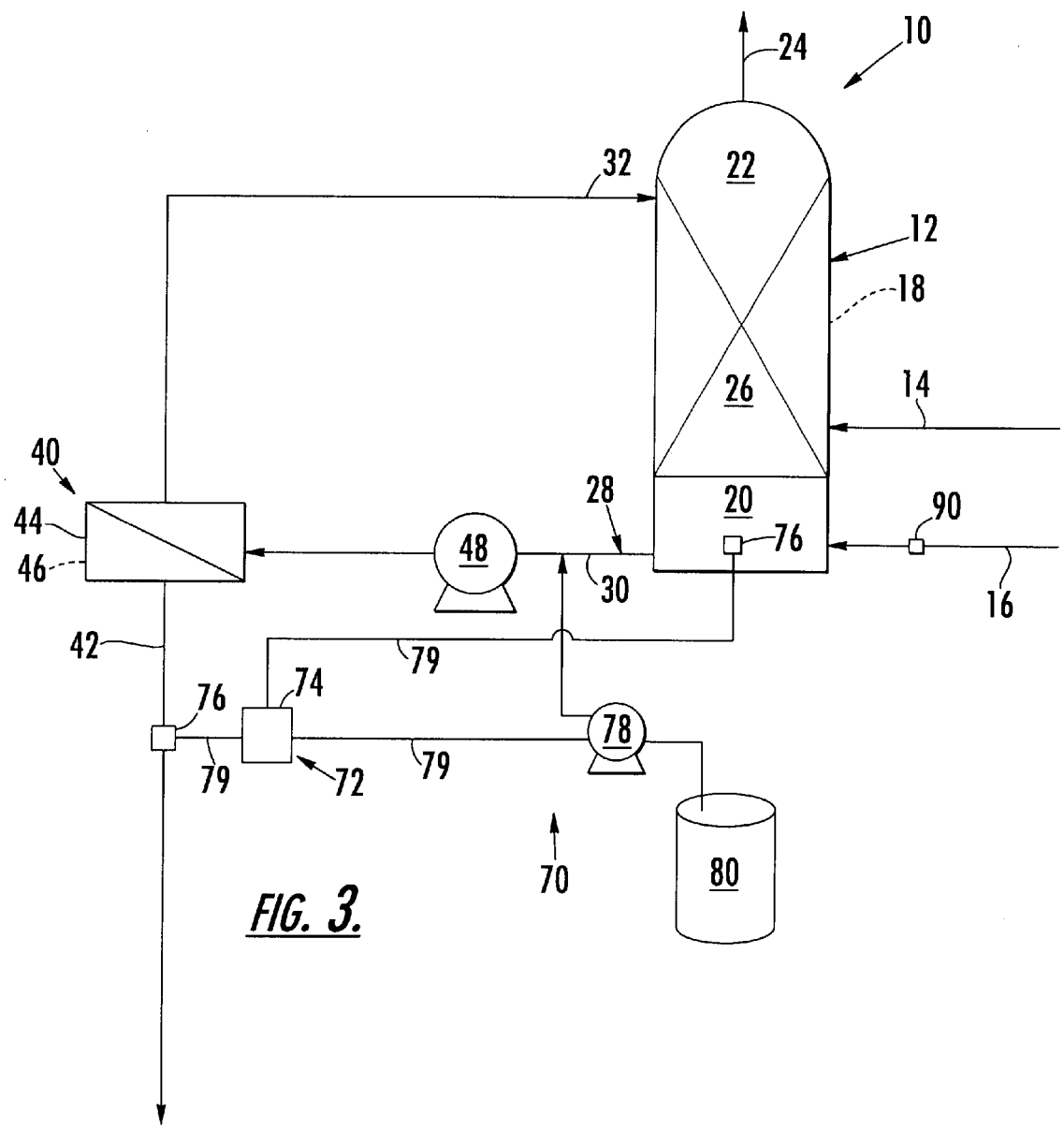
FIG. 3 is a schematic view of an isopropyl alcohol scrubbing system adapted to operate at an elevated pH.

An example of a suitable pH assembly is shown in FIG. 3 and generally indicated at 70. Assembly 70 includes a control system 72 with a controller 74 that communicates with one or more pH sensors, or probes, 76 that are adapted to measure the pH of the fluid in system 10. Controller 74 may communicates with the sensors via any suitable communication link, or line, 79. The communication links between controller 74 and the sensors, the subsequently discussed base-delivery assembly and the subsequently discussed ion-removal assembly may be any suitable wired, mechanical or wireless mechanism for at least one-way communication between controller 74 and the selected component of system 10. For example, in FIG. 3, two sensors 76 are shown, one to measure the pH in the sump portion 20 of scrubber 12 and another to measure the pH of waste stream 42 from the RO assembly. It should be understood that more or less pH sensors may be used, including monitoring at locations other than those illustrated in FIG. 3. Responsive to the measured pH value, the controller prevents the pH from exceeding one or more determined threshold values through any suitable mechanism, such as a PID loop. For example, controller 74 may be adapted to maintain the pH of the system between selected upper and lower threshold values. Alternatively, only an upper or lower threshold value may be used.

Because makeup water is being continuously or periodically added to the system, while fluid from the system is continuously or periodically being drawn away, the overall pH of the system will tend to decrease over time. To prevent the pH from dropping below a selected threshold value, controller 74 causes the pH to be raised, such as by adding a suitable alkaline or pH-raising substance to the fluid in the system. For example, as shown in FIG. 3, controller 74 communicates with a pump assembly 78 adapted to draw a selected base from a supply, or reservoir, 80 responsive to control signals from controller 74 through control signal wiring 79. As shown, the base is added to recycle feed stream 30; however, it is within the scope of the invention that the added base may be introduced to the system in additional or other locations. Having the base delivered upstream from the RO assembly may be preferred because biofouling is most prevalent in the RO assembly.

An example of a suitable alkaline, or base chemical, is sodium hydroxide, or caustic, which not only performs well in the IPA scrubber operating environment but also is cost effective, especially when the facility already has a need for caustic and thereby already has caustic storage and delivery systems. Other suitable RO configurations, pretreatments and operating conditions are disclosed in U.S. Pat. No. 5,925,255, the disclosure of which is hereby incorporated by reference.

The pH of the fluid in system 10 may be further controlled by adding an ion-removal assembly to the recirculation loop, such as downstream from the RO assembly. For example, a sodium zeolite or weak acid cation (WAC) resin system may be used. Sodium zeolite and WAC resin bottles, for example, are relatively inexpensive and may be regenerated after use, either on site or by service water companies. This process step is beneficial in reducing the salting of the packing in the scrubber.

Figure 4:
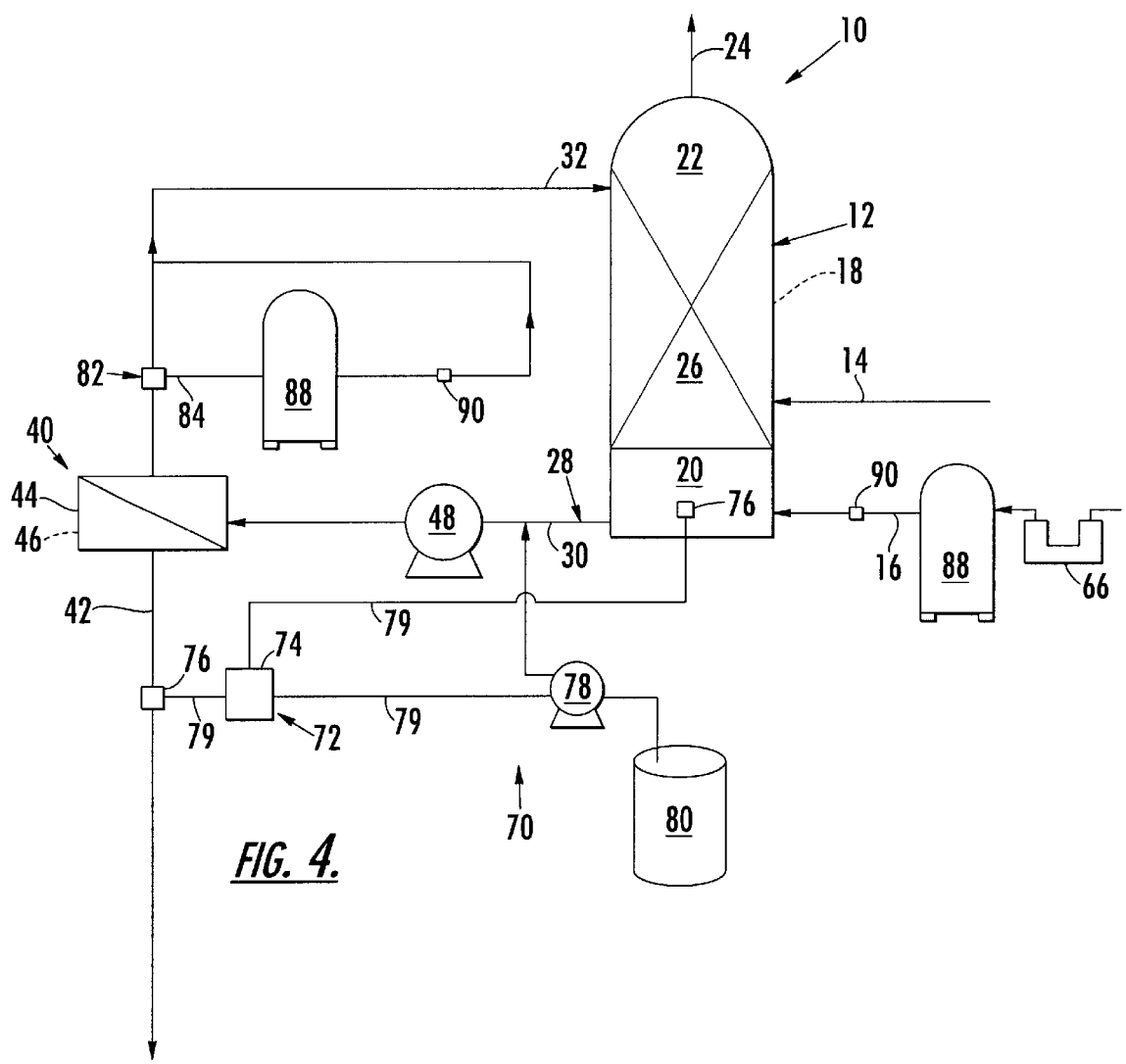
FIG. 4 is a schematic view of another isopropyl alcohol scrubbing system adapted to operate at an elevated pH.

An example of an IPA scrubbing system with an ion-removal assembly is shown in FIG. 4. As shown, a valve assembly 82 selectively diverts a portion of recycle product stream 32 to form side stream 84, which is passed through an ion-removal assembly 88. An example of a suitable ion-removal assembly is a portable WAC resin bottle. The pH in the portion of stream 32 passing through assembly 88 is lowered by the removal of sodium ions, thereby causing the association of hydroxide ions with hydroniumn ions to produce neutral water. This reduces the overall pH of the recycle stream when the side stream is recombined with the rest of the recycle product stream. The portion of the recycle stream diverted by valve assembly 82 may vary, between none of the stream and all of the stream, and is regulated manually or preferably by control system 72, and more particularly by control signals through a suitable communication line (not shown) from controller 74.

Figure 5:
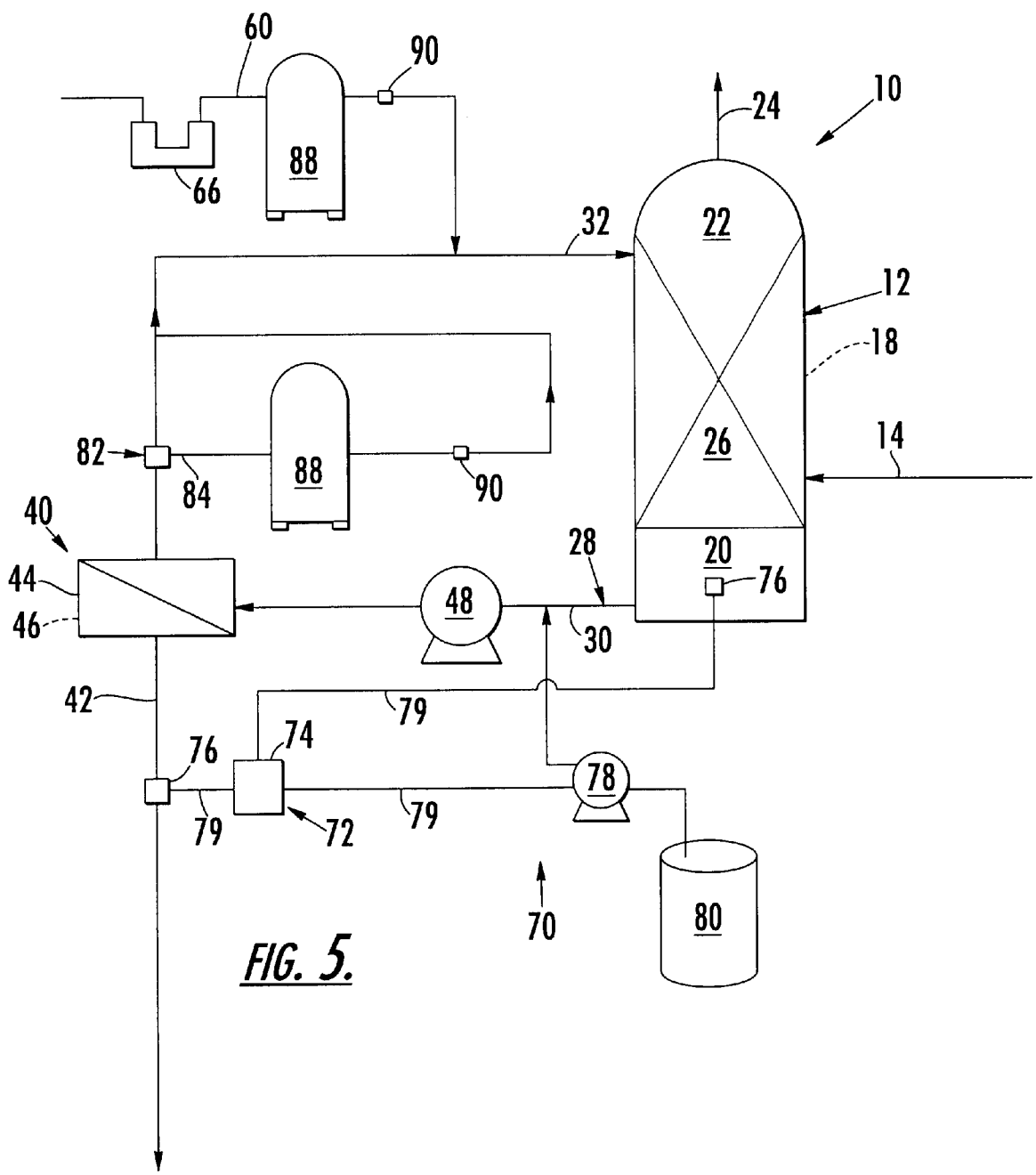
FIG. 5 is a schematic view of another isopropyl alcohol scrubbing system adapted to operate at an elevated pH.

In addition to removing sodium ions from fluid passing through it, ion-removal assembly 88 may also be used to remove undesirable ions elsewhere in the system. For example, in FIG. 4, another ion-removal assembly 88 is shown adapted to treat makeup water stream 16 and in FIG. 5 adapted to treat water stream 60. Whether direct from an outside source or reclaimed from elsewhere within the FAB or other facility within which system 10 is used, water stream 16, or 60, may contain concentrations of calcium, magnesium, strontium, aluminum and other polyvalent cations that will tend to precipitate out of solution and impair the operation of system 10. For example, the precipitated mineral salts will tend to foul RO membranes 46 and the packing or trays in scrubber 12. A manual or computerized hardness monitor 90, or other suitable sensor, may be used downstream of any of the ion-removal assemblies 88 as a safeguard, or indicator, of when the assemblies need to be cleaned or otherwise regenerated. As indicated in FIGS. 4 and 5 in a preferred embodiment a medium pressure UV unit is located ahead of the WAC resin bed to reduce chlorine or bromine biocide to a minimum level, less than 0.1 mg/L, which is compatible with the WAC resin. Such a UV unit is available from Aquionix, Inc.

The general equation for divalent cation removal by WAC resin in the hydronium form is represented below:

$$2RCOOH + M^{++}(HCO_3)_2 \rightarrow RCOOM^{++}OOCR + 2H_2O + 2CO_2 \qquad \text{Equation \#1:}$$

This is the primary reaction occurring in the WAC resin on the makeup water feed.

Concurrently, the WAC resin in the bottle on the recirculation stream is almost exclusively removing sodium according to the following reaction:

$$RCOOH + NaOH \rightarrow RCOONa + H_2O \qquad \text{Equation \#2:}$$

Subsequently in a preferred embodiment the partially exhausted WAC resin in the sodium form is shifted from the recirculation stream to the make-up water feed where it removes divalent cations, such as according to the following reactions:

$$2RCOONa + M^{++}(HCO3)_2 \rightarrow RCOOM^{++}OOCR + 2NaHCO_3 \qquad \text{Equation \#3a:}$$

$$2RCOONa + M^{++}(Cl_2) \rightarrow RCOOM^{++}OOCR + 2NaCl \qquad \text{Equation \#3b:}$$

$$2RCOONa + M^{++}(OH)_2 \rightarrow RCOOM^{++}OOCR + 2NaOH \qquad \text{Equation \#3c:}$$

Through this preferred embodiment removal of sodium in the scrubber tower recirculation loop can be accomplished at little or no operating expense. The substitution of hydronium on the recirculation loop for sodium according to Equation #2 reduces the potential salting effect in the scrubber packing from NaOH and lowers the pH of the scrubbing countercurrent water flow. In addition the shedding of sodium in the application of WAC in the make-up water feed as indicated in Equation #3b reduces the required amount of caustic that must be feed to the recirculation loop feed to the RO. The sodium bicarbonate ($NaHCO_3$) is converted to sodium hydroxide (NaOH) after carbon dioxide ($CO_2$) is given off as a gas. The WAC resin on the recirculation loop will not be operated to full exhaustion. Thus a relatively large percentage, such as approximately 70% of the resin will still be in the hydronium form and approximately 30% of the resin will be in the sodium. Thus, all four chemical reactions given in the representative Equations #1 through #3c will be occurring to some degree on the make-up water feed stream. Similar reactions will occur for trivalent cations.

While the invention has been disclosed in its preferred form, the specific embodiments thereof as disclosed and illustrated herein are not to be considered in a limiting sense as numerous variations are possible. It is intended that any singular terms used herein do not preclude the use of more than one of that element, and that embodiments utilizing more than one of any particular element are within the spirit and scope of the present invention. Applicants regard the subject matter of the invention to include all novel and non-obvious combinations and subcombinations of the various elements, features, functions and/or properties disclosed herein. No single feature, function, element or property of the disclosed embodiments is essential to all embodiments. The following claims define certain combinations and subcombinations that are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, are also regarded as included within the subject matter of Applicants' invention.

Industrial Applicability

The present invention is applicable to any facility in which a gas or liquid phase effluent containing isopropyl alcohol needs to be treated to reduce the concentration of isopropyl alcohol therein.

We claim:

1. A gas phase isopropyl alcohol (IPA) removal system, comprising:
    a scrubber unit having a liquid sump portion and a liquid recirculation portion and adapted to receive and contact a gas feed stream containing a concentration of IPA with a water stream;
    a pump assembly adapted to draw a recirculation stream from the liquid sump portion of the scrubber unit and deliver the recirculation stream to the return portion of the scrubber unit, wherein the recirculation stream contains at least a portion of the IPA in the feed stream; and
    a reverse osmosis assembly including at least one reverse osmosis unit adapted to receive the recirculation stream prior to delivery to the return portion of the scrubber unit and to reduce the concentration of IPA therein to below a determined threshold value to form a waste stream containing the removed IPA.

2. The system of claim 1, wherein the reverse osmosis assembly is adapted to remove at least a majority of the IPA in the recycle stream.

3. The system of claim 1, wherein the reverse osmosis assembly is adapted to at least substantially minimize the flowrate of water in the waste stream.

4. The system of claim 1, wherein the reverse osmosis assembly includes a plurality of reverse osmosis units connected in at least one of series and parallel.

5. The system of claim 1, wherein the waste stream contains less than approximately 25% of the flow of the recycle stream.

6. The system of claim 5, wherein the waste stream contains less than approximately 25% of the flow of the recycle stream.

7. The system of claim 1, wherein the waste stream contains at least 70% of the IPA in the recycle stream.

8. The system of claim 1, wherein the system operates at a pH greater than 7.

9. The system of claim 8, wherein the system operates at a pH in the range of approximately 9 and approximately 11.

10. The system of claim 1, wherein the feed stream includes an exhaust gas stream from a semiconductor processing facility.

11. The system of claim 1, wherein the system further includes a pH assembly adapted to maintain the pH of the system within selected threshold values.

12. The system of claim 11, wherein the pH assembly includes a control system adapted to monitor the pH in the system and selectively adjust the pH to maintain the pH within selected threshold values.

13. The system of claim 11, wherein the pH assembly includes at least one sensor adapted to measure the pH at one or more selected locations in the system and a controller in communication with the at least one sensor and adapted to selectively raise or lower the pH of the system responsive to inputs from the at least one sensor.

14. The system of claim 13, wherein the pH assembly includes a supply of an alkaline substance and a delivery system adapted to selectively add base to the system responsive to control signals from the controller.

15. The system of claim 13, wherein the pH assembly is adapted to lower the pH of the system responsive to control signals from the controller.

16. The system of claim 15, wherein the pH assembly is adapted to divert at least a portion of the recirculation stream and reduce the pH therein responsive to control signals from the controller.

17. A method for treating a process gas stream containing isopropyl alcohol (IPA), the method comprising:
    receiving a gas phase feed stream containing IPA and a water stream into a system containing at least one scrubber unit and at least one reverse osmosis assembly;
    contacting the feed and water streams in the scrubber unit to produce a product stream containing at least a portion of the IPA in the feed stream;
    drawing the product stream through the reverse osmosis assembly to produce a recirculation stream containing a concentration of IPA that is less than a determined threshold value, and a waste stream containing the removed IPA; and
    returning the recirculation stream to the scrubber unit.

18. The method of claim 17, wherein the waste stream contains at least 70% of the IPA in the feed stream.

19. The method of claim 18, wherein the flowrate of the waste stream is less than approximately 25% of the flowrate of the product stream.

20. The method of claim 17, wherein the method further includes measuring the pH of fluid in at least one of the scrubber unit, the waste stream, the product stream and the recirculation stream.

21. The method of claim 20, wherein the method further includes actuating a pH assembly to raise the pH of the system if the measured pH is lower than a determined threshold value.

22. The method of claim 20, wherein the method further includes actuating a pH assembly to lower the pH of the system if the measured pH is higher than a determined threshold value.

23. The method of claim 22, wherein actuating the pH assembly includes lowering the pH of a selected portion of the recycle stream.

24. An isopropyl alcohol (IPA) removal system, comprising:
    a scrubber unit having a liquid sump portion and a return portion and adapted to receive and contact a gas feed stream containing a concentration of IPA with a water stream;
    a pump assembly adapted to draw a recirculation stream from the sump portion of the scrubber unit and deliver the recirculated stream to the return portion of the scrubber unit, wherein the recirculation stream contains at least a portion of the IPA in the feed stream;

means for maintaining the pH of the system within selected threshold values; and means for reducing the concentration of IPA in the recirculation stream to below a determined threshold value.

25. The system of claim 24, wherein the means for reducing are adapted to remove at least 70% of the IPA from the recirculation stream.

26. The system of claim 25, wherein the means for reducing are adapted to remove at least 85% of the IPA from the recirculation stream.

27. The system of claim 24, wherein the means for reducing are adapted to produce a waste stream with a flowrate that is less than approximately 25% of the flowrate of the recirculation stream.

28. The system of claim 27, wherein the means for reducing are adapted to produce a waste stream with a flowrate that is less than approximately 10% of the flowrate of the recycle stream.

29. The system of claim 24, wherein the means for removing include at least one reverse osmosis unit.

30. The system of claim 24, wherein the means for maintaining are adapted to maintain the system at a pH between approximately 8 and approximately 11.

31. The system of claim 24, wherein the means for maintaining include at least one sensor adapted to measure the pH at one or more selected locations in the system and a controller in communication with the at least one sensor and adapted to selectively raise or lower the pH of the system responsive to inputs from the at least one sensor.

32. The system of claim 24, wherein the means for maintaining includes weak acid cation resin beds configured to treat the recirculation stream and the water stream.

33. The system of claim 32, wherein the weak acid cation resin beds are adapted to be rotated between the recirculation and water streams.

* * * * *

UNITED STATES PATENT AND TRADEMARK OFFICE
CERTIFICATE OF CORRECTION

PATENT NO. : 6,306,197 B1  
DATED : October 23, 2001  
INVENTOR(S) : Boyce et al.

It is certified that error appears in the above-identified patent and that said Letters Patent is hereby corrected as shown below:

Title page,
Item [56], References Cited, FOREIGN PATENT DOCUMENTS,
"1/1978" should read -- 1/1976 --;
"52-122084" should read -- 58/122084 --.

Signed and Sealed this

Sixth Day of August, 2002

*Attest:*

*Attesting Officer*

JAMES E. ROGAN  
*Director of the United States Patent and Trademark Office*